US012758876B2

(12) United States Patent
Leslie et al.

(10) Patent No.: US 12,758,876 B2
(45) Date of Patent: Oct. 13, 2026

(54) PERSISTENCE OF PLAYER STATE VARIABLES IN A PEER TO PEER ENVIRONMENT

(71) Applicant: VRChat Inc., San Francisco, CA (US)

(72) Inventors: Daniel James Leslie, British Columbia (CA); Neil Kandalgaonkar, Vancouver (CA); Jesse Joudrey, Port Coquitlam (CA)

(73) Assignee: VRCHAT INC., San Francisco, CA (US)

( * ) Notice: Subject to any disclaimer, the term of this patent is extended or adjusted under 35 U.S.C. 154(b) by 432 days.

(21) Appl. No.: 18/367,327

(22) Filed: Sep. 12, 2023

(65) Prior Publication Data

US 2025/0083044 A1 Mar. 13, 2025

(51) Int. Cl.

*A63F 13/537* (2014.01)
*A63F 13/34* (2014.01)
*A63F 13/49* (2014.01)
*A63F 13/79* (2014.01)

(52) U.S. Cl.

CPC ............ *A63F 13/537* (2014.09); *A63F 13/34* (2014.09); *A63F 13/49* (2014.09); *A63F 13/79* (2014.09)

(58) Field of Classification Search

CPC ........ A63F 13/795; A63F 13/35; A63F 13/79; A63F 13/49; A63F 13/34; A63F 13/537
USPC ............................................................ 463/31
See application file for complete search history.

(56) References Cited

U.S. PATENT DOCUMENTS 4,742,344 A * 5/1988 Nakagawa ............... G09G 5/30 345/565
8,721,443 B2 * 5/2014 Crocker ................ A63F 13/533 715/757
10,843,077 B2 * 11/2020 Deller ................... H04L 67/131
12,511,655 B2 * 12/2025 Oest ................... G06Q 20/4016
2006/0206866 A1 * 9/2006 Eldrige .................. G05B 15/02 717/122
2009/0164522 A1 * 6/2009 Fahey ..................... H04L 63/30
2010/0313009 A1 * 12/2010 Combet .............. H04L 63/0421 709/224
2011/0040638 A1 * 2/2011 Rabenold ............... G06Q 30/08 705/14.73

(Continued)

OTHER PUBLICATIONS

Erdi Izgi; "Framework for Roguelike Video Games Development"—Charles University—Department of Software and Computer Science Education; Computer Graphics and Game Development, Prague 2018; Master Thesis. (Year: 2018).*

(Continued)

*Primary Examiner* — Michael A Cuff
(74) *Attorney, Agent, or Firm* — Polsinelli PC

(57) ABSTRACT

The present technology allows state information associated with a player to be saved at a first time and restored at a second time. The state information can pertain to attributes of the player such as stats associated with the player in a particular environment or collection of environments, can pertain to attributes of an avatar such as a current outfit or skin worn by the avatar, current settings for an avatar, adornments or objects possessed by an avatar, etc. The state information can also pertain to attributes of a virtual world as interacted with by the player such as the location of objects or characteristics of objects that the player may have previously interacted with.

20 Claims, 9 Drawing Sheets

(56) References Cited

U.S. PATENT DOCUMENTS

| | | | | |
|---|---|---|---|---|
| 2013/0107946 | A1* | 5/2013 | Kohno | H04N 19/86<br>375/240.03 |
| 2015/0120821 | A1* | 4/2015 | Bendell | G06F 16/957<br>709/203 |
| 2016/0027260 | A1* | 1/2016 | Pierce | G07F 17/3276<br>463/7 |
| 2016/0220866 | A1* | 8/2016 | Feichtinger | G16H 20/30 |
| 2018/0256981 | A1* | 9/2018 | Enomoto | A63F 13/67 |
| 2019/0192977 | A1* | 6/2019 | Eatedali | A63F 13/35 |
| 2019/0287339 | A1* | 9/2019 | Oberberger | G07F 17/3244 |
| 2019/0388786 | A1* | 12/2019 | D'angelo | A63F 13/537 |
| 2020/0038753 | A1* | 2/2020 | Kojima | A63F 13/211 |
| 2020/0155943 | A1* | 5/2020 | Eatedali | A63F 13/67 |
| 2021/0138349 | A1* | 5/2021 | Zien | A63F 13/69 |
| 2024/0161412 | A1* | 5/2024 | Jia | G06F 3/011 |
| 2025/0050207 | A1* | 2/2025 | O'Sullivan | A63F 13/497 |

OTHER PUBLICATIONS

Squanchy Gaming, "Teaching Tarkov Episode 1: The Beginner's Guide to Escape From Tarkov 2022", https://www.youtube.com/watch?v=yTXXf1CqJpQ, Dec. 6, 2021 (Year: 2021).*

Piranha, "Hideout Tips—Tips Guide—Escape From Tarkov", https://www.youtube.com/watch?v=IBdA5gdkmPI, Jun. 9, 2020 (Year: 2020).*

* cited by examiner

PERSISTENCE OF PLAYER STATE VARIABLES IN A PEER TO PEER ENVIRONMENT

BACKGROUND

Some video games save a user's progress through the game. In some sense, this amounts to saving attributes associated with a user between one session with a game to another session. Such functionality might allow a user to store information about progress through a game, such as levels completed, current score, or game items accrued throughout game play.

But multi-player games and especially peer-to-peer games, or virtual environments that can be visited by many players at the same time, do not support the saving of user attributes as they pertain to the virtual environment. This is because the state of the game is closely tied to the interactions of other users present during an existing game session that might not be present during a future game session.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
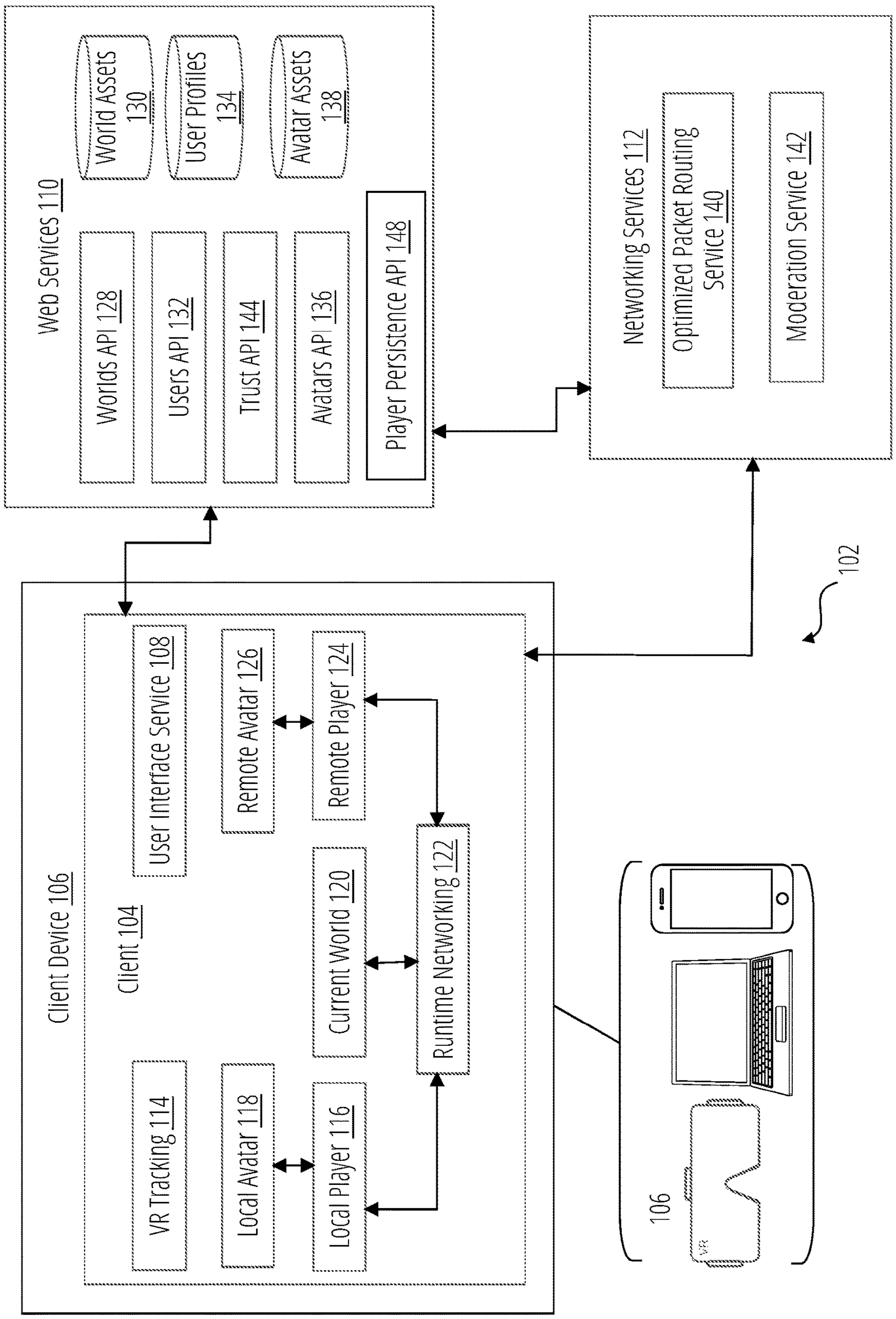
FIG. 1 illustrates an example virtual environment platform for playing and hosting a multiplayer virtual reality (VR) experience in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In some embodiments, player persistence can be maintained and applied automatically. For example, player state parameters can be saved without explicit instruction from the player, and when a player initiates a new session by interacting with a virtual environment, the supported aspects of player persistence can be reinstated automatically. In contrast, instance persistence can be saved and reinstated in response to specific user inputs. Some virtual environments, such as video games or virtual worlds save a player's progress through the game. In some sense, this amounts to saving state associated with the virtual environment between one session with a game to another session. Such functionality might allow a user to store information about progress through the virtual environment, such as levels completed, current score, or game items accrued throughout gameplay. However, this saving of state comes from instance persistence (e.g., saving an instance of the virtual environment), which is effective in a single player scenario because the environment and player are linked together in a 1:1 relationship (that player only exists in that virtual environment, and that state of the virtual environment only occurs with that player).

Additionally, neither single-player virtual environments nor multi-player virtual environments support player persistence, (e.g., the saving of player state parameters). This is because the developer of the virtual environment is typically concerned with providing an environment for the player to interact with and overlooks the individuality of players that visit the virtual environment. This means that players often cannot bring anything other than an avatar from one virtual environment to another virtual environment or even from one session in a virtual environment to another session in the virtual environment.

Further player persistence of user-generated content, as opposed to developer-created content is not even contemplated by existing systems. Existing systems, to the limited extent that they persist any state data, save the state for objects provided by the game. This is because developers are focused on the objects that they provide and do not contemplate that a player might want to save state of their user-created objects too.

The present technology supports both saving of instance persistence and player persistence.

The present technology addresses a need in the art to support instance persistence through the saving of player state parameters in environments such as multi-participant environments and peer-to-peer environments, and more generally any environment in which the player state parameters can be supported.

There is a growing need to support the individuality of players. For example, some environments allow users to create their own avatars that not only have an individualistic look but may also be associated with custom functionalities, scripts, and differences in graphics quality. In some 3D environments, some players have avatars that might support hand tracking, some avatars might support eye tracking, some avatars might support tracking of multiple joints, and individual fingers. Some avatars might be configured for secondary motion characteristics that allow life-like movements of clothes, hair, and appendages. Some avatars might be configured to accept contact from other avatars or may have scripts configured that trigger resulting from contact with another avatar or an object in the environment.

Perhaps related to or stemming from the high degree of individuality being reflected in some avatars, many users invest a large amount of time in developing their avatar. In some cases, the greater the time spent developing the avatar and participating in environments as the avatar, the greater a user may come to identify with their avatar. The avatar can become more than a collection of textures, animations, and scripts and can also embody experiences had through the avatar. While some of these experiences may be in the form of memories and emotional sentiments, some of these experiences can result in changes of state associated with the avatar, and players desire to bring these changes of state associated with the avatar with them as their avatar enters new environments.

For example, if a first player experiences a virtual environment as their avatar and has a social interaction with a second player where the second player gives the first player a digital item as a gift, the first player may desire that their avatar be able to bring that digital item with them into other worlds. For example, if the digital item were something that can adorn the costume of their avatar, the first player may desire the item to be displayed on their avatar in other worlds. This may be especially important if the first player and second player are friends and the gift has some meaning between them. There may be an emotional desire for the avatar of the first player to have the digital item displayed on their avatar when the first player and second player meet in other sessions or other virtual environments. The present technology provides a mechanism by which the avatar of the first player can save player state parameters, including parameters that embody the digital item, associated with the avatar or player that can be reinstated in future sessions or in other virtual environments.

In another example, the first player may be interacting with an object within a virtual environment, and the first player may change the state of the object within the virtual environment. For example, the virtual environment may be an art studio environment and the change of state may be a work of digital art. The player may want to be able to save their state and take their digital art created in one world and display it in another world. The present technology provides a mechanism by which the first player can save state information associated with the avatar or player that can be reinstated in future sessions or in other virtual environments.

In another example, the first player may be playing a role-playing game in a multiplayer environment, and as the user progresses through the role-playing game the user may have accrued various stats or objects that are meaningful to the progression of the role-playing game. In this example, the player would not be excited to return to a new session of the role-playing game at a later time only to find that the stats and objects that the user the player may have accrued have disappeared. The present technology provides a mechanism by which the first player can save state information associated with the avatar or player that can be reinstated in future sessions such that the player can reappear in a new session and with the previously accrued stats or objects.

The present technology provides more than the ability to restore an inventory of developer-created objects when a player returns to an existing world. First, an inventory is generally associated with the avatar in specific game-developer worlds. The present technology allows any object to have its state stored in association with the player profile, and is not included in the avatar assets.

Additionally, state parameters include all state-related data associated with an object. The state-related information is unbounded and can be complex. In one example, state information can be used to bring an object into a world that is not part of the world assets or the avatar assets. For example, the state information could reference a resource with a pointer to that resource with information about how the resource should be rendered in that world. The resource could be some user-generated content or content from an Internet resource.

The present technology also addresses a multi-party problem wherein a world can be authored by a first creator, an avatar can be authored by a second creator, and some additional content can be authored by a third creator. The present technology provides for a mechanism for saving state of any combination of world, avatar, and additional content from the perspective of the player (i.e., state can be stored for the world as the player last experienced it; state can be restored for an avatar as the player last experienced it (in the world or another world); state can be restored for the additional content as the player last experienced the additional content, etc.).

These are just some examples of situations in which the present technology may be useful.

More specifically the present technology allows state information associated with a player to be saved at a first time and restored at a second time. The state information can pertain to attributes of the player such as stats associated with the player in a particular environment or collection of environments, can pertain to attributes of an avatar such as a current outfit or skin worn by the avatar, current settings for an avatar, adornments or objects possessed by an avatar, etc. The state information can also pertain to attributes of a virtual world as interacted with by the player such as the location of objects or characteristics of objects that the player may have previously interacted with.

In some embodiments, the author of the virtual environment can specify one or more variables for which state may be saved and imported. For example, the author of a virtual environment may specify that an object can be moved from its initial location in a world to other locations in a world, and the author can determine if the state of the object can be saved in association with a user profile. When the user attempts to start a new session with a past environment or enter into a new environment, the environment can specify variables for which state may be imported. If any of those variables have a state associated with it in association with the user account that state can be imported into the environment upon entering.

One challenge of the present technology is that in a multiplayer or peer-to-peer environment, many different players have the potential to store their own state associated with the same object. This can create conflicts if the player attempts to enter a world in which a current state for that object already exists that might conflict with the state to be imported. The present technology provides for authors of worlds to create conflict resolution rules for such instances. For example, if a first player had a light switch “on” and another player had it "off", both players will both have their own state saved for the light switch in that world. Later, if both players appear in the same instance of the world with their conflicting states for the light switch, it is up to the world creator to decide which state to use.

FIG. 1 illustrates an example virtual environment platform 102 for playing and hosting a multiplayer virtual reality (VR) experience that is suited to carrying out the present technology. The virtual environment platform 102 can connect clients 104 through web services 110 and networking services 112 to socially interact together in a virtual environment hosted by virtual environment platform 102.

The virtual environment platform 102 includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual environments through the worlds API 128, user profiles through the users API 132, trust and safety through the trust API 144, and avatars through avatars API 136. Web services 110 generally stores and provides long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual environment. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first person inputs from a user of the client device 106 upon which client 104 is executing and handles third party inputs received from another user operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual environments or complex avatars might not be configured to perform well on certain device types, and therefore, while client 104 can operate on many platforms and devices, not all virtual environments or complex avatars will be available or have full functionality on all client devices 106.

User interface service 108 is one service that is part of client 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available virtual environments by calling worlds API 128 to retrieve a list of virtual environments to which the user account logged into client 104 is permitted to enter. Worlds API 128 can retrieve all public virtual environments from the world assets database 130 and send a list of those to client 104. Additionally, worlds API 128 can request world IDs for any private virtual environments associated with the user account logged into client 104 and retrieve the private virtual environments from the world assets database 130 to send to client 104. User interface service 108 can receive user inputs through a hardware interface to navigate through the worlds menu and to receive a selection of a virtual environment to visit.

As used herein, the terms environment and world are generally synonymous and refer to a virtualized space regardless of whether the space is a two-dimensional space, a three-dimensional space, or whether the virtualized space encompasses a spherical area such as a planet or a small plot or room. That is the term environment is generally more accurate, but individual environments are often colloquially called worlds.

Another user interface provided by user interface service 108 pertains to various user settings. Such settings can pertain to whether the human player is sitting or standing, settings to minimize motion sickness in players that are susceptible to motion sickness when playing in VR, settings to select an avatar, settings about how a player might be viewed and by whom a player might be viewed in a virtual environment.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual environment platform 102 since they have not built up trust within the virtual environment platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual environment from the menu provided by the user interface service 108, client 104 can download an instance of the virtual environment by calling the worlds API 128, which can retrieve the virtual environment from the world assets database 130 and send it to client 104 for execution.

The virtual environment assets are large binary files built for a game engine, such as UNITY using an editor with a software development kit (SDK) provided for use with the virtual environment platform 102. If a user travels into a virtual environment, they need to download that virtual environment asset from world assets database 130. If there are already people in that instance of the virtual environment, client 104 also needs a list of the avatars of those people so that the avatars can be rendered in the instance of the virtual environment.

In some embodiments, a function of the worlds API 128 can confirm that the user account can access the requested virtual environment. While the user account should only have the ability to view public virtual environments in the user interface menu or should only have knowledge of links to virtual environments that have been shared with the user account, the worlds API 128 can confirm the user account is permitted to access the virtual environment as a redundancy measure.

In addition to downloading the instance of the virtual environment, the client 104 can also establish a session with networking services 112 for the specific instance of the virtual environment. Networking services 112 can provide information about the current state of the instance of the virtual environment. For example, networking services 112 can provide a list of remote avatars 126 present in the virtual environment instance to client 104. In turn, client 104 can contact the avatars API 136 to download avatar assets for the list of remote avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual environment, or if the avatar has non-standard movement dynamics.

The downloaded instance of the virtual environment can be executed by client 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client 104, and the user of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many remote avatars 126 in the same current world 120.

The current world 120 also has features that require networking. The current world 120 could have objects, like scissors or a light switch, that a user can pick up, and the object needs to broadcast its state across the network so that other users in the current world 120 can view the current state of the object.

Each of the local player 116, current world 120, and remote player 124 are connected to the runtime networking service 122. The local player 116 primarily transmits updated state information for the local player 116 to remote instances of client 104 that are also executing the same virtual environment. The current world 120 can transmit and receive state information about the instance of the virtual environment. The current world executing on client 104 transmits state information when the state change is owned by the local player 116 and receives state information when the state change is owned by the remote player 124.

Networking services 112 are the network-side part of the networking layer of the virtual environment platform 102. In some embodiments, portions of the networking services 112 are provided by a networking plug-in such as the PHOTON networking engine, which broadcasts state information to all users in an instance of a virtual environment.

In addition to the general broadcasting of state information to all users interacting with an instance of a virtual environment, the optimized packet routing service 140 provides more advanced features that provide an enhanced user experience and enforces other virtual environment platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual environments platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual environment at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client 104, virtual environments, and complex avatars can be configured to operate in a particular game engine, especially a game engine that supports three-dimensional (3D) environments. Two common game engines include UNITY and UNREAL ENGINE.

In some embodiments, to be supported by virtual environment platform 102, virtual environments and avatars need to be developed in compliance with a software development kit (SDK). For example, avatars require a particular script to be usable in the virtual environment platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual environments to utilize a particular coding language to ensure the world has compliant behaviors. For example, the SDK can require that behaviors in worlds are defined using UDON, a programming language specific to a particular virtual environment platform 102, VRCHAT. In some embodiments, the programming language facilitates a world built using the programming language to comply with file access safeguards provided by the virtual environment platform 102. For example, a world cannot read or write anything to a hard drive, and only approved web pages can be rendered in a world on the virtual environment platform 102.

While the virtual environment platform 102 is suited to carrying out the present technology, persons of ordinary skill in the art will appreciate that the present technology can be used in other environments.

Figure 2:
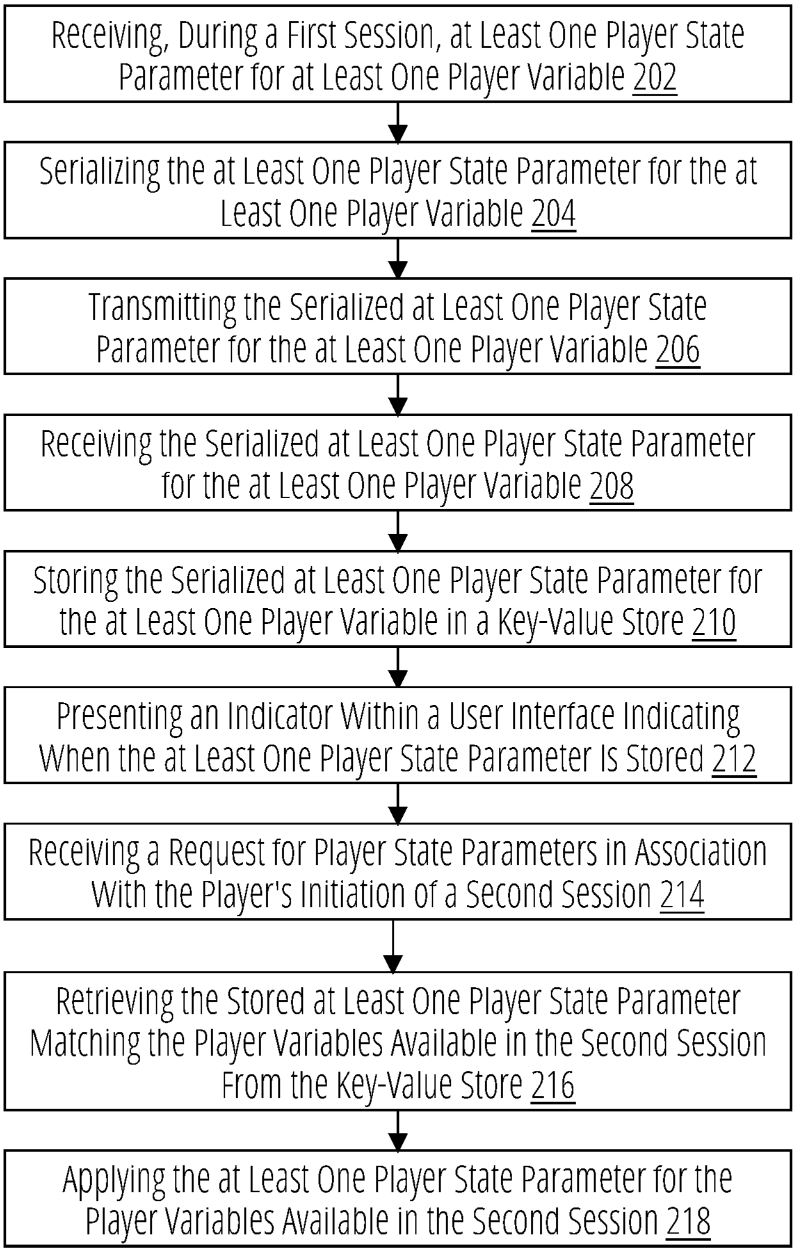
FIG. 2 illustrates an example routine for persisting player state across multiple sessions in a peer-to-peer application environment in accordance with some aspects of the present technology.

FIG. 2 illustrates an example routine for persisting player state across multiple sessions in a peer-to-peer application environment in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As addressed above, the present technology addresses a need in the art for player persistence, e.g., to persist player state across multiple sessions in a peer-to-peer application environment. "Session" refers to a period of interacting with a virtual environment where a session typically begins with loading an instance of a virtual environment into memory on the client device and a session typically ends with saving player state parameters and/or making the instance of the virtual environment available for purging from memory. An example of multiple sessions includes interacting with two different instances of the same virtual environment such that a first session is a first period of interacting with a first instance of a virtual environment, and a second session is a period of interaction with the second instance of the virtual environment that begins with loading the second instance of the virtual environment. Another example of multiple sessions includes leaving an instance of a virtual environment and returning to the instance of the virtual environment where the first session occurs prior to leaving the instance of the virtual environment and the second session occurs after returning to and loading the instance of the virtual environment. Another example of multiple sessions includes interacting across different virtual environments where a first session occurs while interacting with a first virtual environment and a second session occurs while interacting with a second virtual environment (after loading the second virtual environment).

According to some examples, the method includes receiving, during a first session, at least one player state parameter for at least one player variable at block 202. For example, the client 104 illustrated in FIG. 1 may receive, during a first session, at least one player state parameter for at least one player variable. "Player variable" refers to any variable that relates to the state of the player. For example, the player variable can be one or more of an avatar variable, a user account variable, or a world variable. An avatar variable is a variable that affects a state of an avatar of the player (e.g., a skin of the avatar, whether a script, animation, or function is turned on or off, etc.). A user account variable is a variable that affects a state of a user account (e.g., objects acquired, stats accrued, etc.). A world variable is a variable that affects the state of an object in a world occupied by the player (location, activation, progression, of an object, a selected option available in the world, etc.). While a player's user profile might be associated with many stored player variables, the virtual environment might not support all player variables. For example, a first virtual environment might notsupport the state of an object that is sourced from a second, unrelated virtual environment. However, the present technology supports the ability for an object generated in a first virtual environment to be brought into a second virtual environment if the second virtual environment does not prohibit such or supports the object.

In some embodiments, player variables can be identified by a unique identifier. The unique identifier can be a union of a string that identifies the container of the player variable and a string of the name of the player variable (e.g. <container, name>). The container can be the object that is the source of the variable. Most commonly this will be an avatar, player, or a virtual environment. In some instances, the player variable can be a hash of the container of the player variable and name. For example, a player variable can be identified by a hash of <avatar ID, name of skin> or a hash of <world ID, name of variable>. In this way, the player variables can be uniquely identified such that player state parameters associated with the player variable can be saved and later reapplied to the player variable as will be described herein.

The player state parameters can be saved periodically or after a significant game event. The significant game event can be specified by a virtual environment, a save operation initiated by the player, or the player exiting the virtual environment, etc.

According to some examples, the method includes serializing the at least one player state parameter for the at least one player variable at block 204. For example, the client 104 illustrated in FIG. 1 may serialize the at least one player state parameter for the at least one player variable after receiving the at least one player state parameter. Different player variables can have data of different types and formats and quantities associated with one or more parameters that are relevant to the player variable. This disparate data is serialized by the client 104 to be transmitted to be stored by web services 110.

According to some examples, the method includes transmitting the serialized at least one player state parameter for the at least one player variable at block 206. For example, the client 104 illustrated in FIG. 1 may transmit the serialized at least one player state parameter for the at least one player variable to the web services 110 using the player persistence API 148.

According to some examples, the method includes receiving the serialized at least one player state parameter for the at least one player variable at block 208. For example, the player persistence API 148 illustrated in FIG. 1 may receive the serialized at least one player state parameter for the at least one player variable. The at least one player variable is identified by a unique identifier. As addressed above, in some embodiments, the unique identifier can be derived from a hash of a string that identifies the player variable and a container name. The container name identifies the world, avatar, or player to which the player variable is associated.

According to some examples, the method includes storing the serialized at least one player state parameter for the at least one player variable in a key-value store at block 210. For example, the player persistence API 148 illustrated in FIG. 1 may cause the serialized at least one player state parameter for the at least one player variable to be stored in a key-value store. The serialized at least one player state parameter is a value associated with the unique identifier as a key in the key-value store.

In some embodiments, the key-value store is limited to the user account and stored in the user profiles database 134.

In some embodiments, the key-value store can be a key-value store storing player state parameters for many players. In such embodiments, the key can be adapted to include a user account identifier so that the stored data is tied to the user account.

In some embodiments, instead of a key-value store, the at least one player state parameter can be stored in a blockchain. The blockchain can be a public or private blockchain, though one advantage of a public blockchain can be that the player state parameters can be more easily accessed by other platforms and virtual environments.

Whatever the actual structure and location of the storage for the player state parameters, the data should be linked to the user profile or at least accessible to the user profile such that a user profile can identify all of their stored data, and the data should only be accessible to the player that created the player state parameters.

In some embodiments, the key-value store can persistently store the player state parameter for the at least one player variable. Newer versions of the player state parameter can be stored over time. While the instance state parameter is stored persistently, the data can be deleted in response to a request from a user account as addressed with respect to FIG. 7.

According to some examples, the method includes presenting an indicator within a user interface indicating when the at least one player state parameter is stored at block 212. For example, the client 104 illustrated in FIG. 1 may present an indicator within a user interface indicating when the at least one player state parameter is stored. The indicator can be an icon or message displayed in the user interface so that the user is aware that their data is being saved. The indicator can serve a function of giving the user comfort that their player data is being stored, while also serving the privacy function of alerting the user that their player data has been stored.

At some point, the player's session with the virtual environment will come to an end and their player state parameters from the session can be stored for later retrieval.

When the player attempts to initiate a second session, the method includes receiving a request for player state parameters at block 214. For example, the player persistence API 148 illustrated in FIG. 1 may receive a request for player state parameters in association with the player's initiation of a second session. A second session occurs when a player accesses a virtual environment at a second time, or when a player accesses a second virtual environment where the second virtual environment uses at least some of the same player variables as a first virtual environment.

The request for the player state parameters can include a list of identifiers for player variables that are supported in the second session. For example, the virtual environment can provide a list of all player variables that are in the virtual environment and for which persistence of state is supported.

For example, if the virtual environment were a game that included accrued stats and collected objects, the player variables for any supported stats and objects would be requested.

In some embodiments, the second session can occur with a second virtual environment that is related to a first virtual environment. Virtual environments can be grouped into world groups. These world groups can be collections of virtual environments that are related and may share supported player variables. For example, a multi-level game could be organized into a collection of virtual environments where a player can collect objects and attributes that would accompany them through all of the virtual environments in the world group.

The request for player state parameters can also include a list of player variables associated with the avatar or player. However, some player variables might not be permitted or supported in some virtual environments. These player variables can be excluded before they are retrieved or excluded before they are applied in the virtual environment as addressed further with respect to FIG. 4.

According to some examples, the method includes determining if the requested player variables are stored in the key-value store, and if they are, retrieving the stored at least one player state parameter matching the player variables available in the second session from the key-value store at block 216. For example, the player persistence API 148 illustrated in FIG. 1 may retrieve the stored at least one player state parameter matching the player variables available in the second session from the key-value store. As addressed above, each player variable should be uniquely identified. Thus, if there is a match of the identifier in the list with an identifier in the key-value store, then the player state parameters that go with the player variable should be sent to the client for use in the virtual environment. It is possible that the list of identifiers will include player variables that are not found in the key-value store for the user account, and this means that there are no player state parameters for that user account for that player variable.

In some instances, such as when a player has participated in many sessions with the virtual environment, there may be several versions of the player state parameters associated with the same player variable. In such instances, the most recent player state parameters are returned.

In some instances, only the most recent player state parameters are stored for a given player variable, and when updated player state parameters are saved they can overwrite the existing player state parameters for the player variable.

In addition to the list of player variables requested by the virtual environment at the start of a session, the avatar can also request player variables associated with the avatar to be retrieved so that the state of the avatar can be restored to an appearance (or another state parameter) for the avatar as last experienced, even if that state of the avatar was last present in a different virtual environment. In this way, the most recent state of an avatar can follow the avatar across unrelated virtual environments.

In some instances, the virtual environment might not explicitly support a player variable such that when the session with the virtual environment is initiated the virtual environment does not request state for the player variable. In such instances, it may be possible for the player to explicitly request a player variable to see if it can be supported in the virtual environment. For example, when the player variable includes a pointer to a resource that can be rendered in the virtual environment, this mechanism can be used to import objects that are not part of the virtual environment and are not an avatar asset into the virtual environment.

According to some examples, the method includes applying the at least one player state parameter for the player variables available in the second session at block 218. For example, the client 104 illustrated in FIG. 1 may apply the at least one player state parameter for the player variables available in the second session.

In this way, aspects of a player's previous state can be present in subsequent sessions with a previously visited virtual environment.

Figure 3:
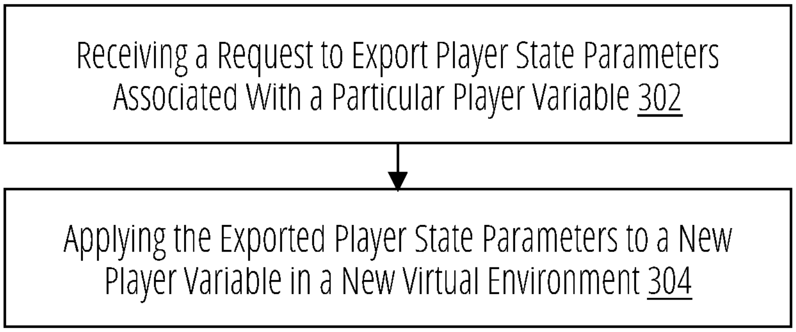
FIG. 3 illustrates an example routine for exporting player state parameters from a first virtual environment to a new virtual environment in accordance with some aspects of the present technology.

FIG. 3 illustrates an example routine for exporting player state parameters from a first virtual environment to a new virtual environment in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As introduced above the present technology can be used to transfer data from a first virtual environment to a second virtual environment. For example, a player may be interacting with a virtual environment that is an art studio and the player may create a work of digital art. The player may want to be able to save their state and take their digital art created in the virtual environment and display it in another virtual environment such as the player's home world. The present technology provides a mechanism by which the first player can save state information associated with the avatar or player that can be reinstated in other virtual environments.

According to some examples, the method includes receiving a request to export player state parameters associated with a particular player variable at block 302. For example, the player persistence API 148 illustrated in FIG. 1 may receive a request to export player state parameters associated with a particular player variable. Returning to the example of the digital art above, the player can request to export the player state parameters associated with the player variable that refers to the digital art.

According to some examples, the method includes applying the exported player state parameters to a new player variable in a new virtual environment at block 304. For example, the player persistence API 148 illustrated in FIG. 1 may apply the exported player state parameters to a new player variable in a new virtual environment. Since the player variable is specific to the first virtual environment, the player persistence API 148 needs to create a new player variable in the key-value store that is associated with the new virtual environment, such as the player's home world. The exported player state parameter can be imported into the new virtual environment by associating the new player variable with the new virtual environment. For example, the artwork created in a first virtual environment needs to be associated with the new virtual environment so that it can be displayed from the player state parameters now associated with the new player variable.

In some embodiments, the player state parameters for the player variable can be exported to an external database such a blockchain which can make it possible to make the digital art or other digital object available to a greater number of platforms and virtual environments. The digital art or digital object can then be associated with a smart contract or a non-fungible token that can regulate its use in virtual environments or even the transferability of the digital object to other players, virtual environments, or platforms.

Figure 4:
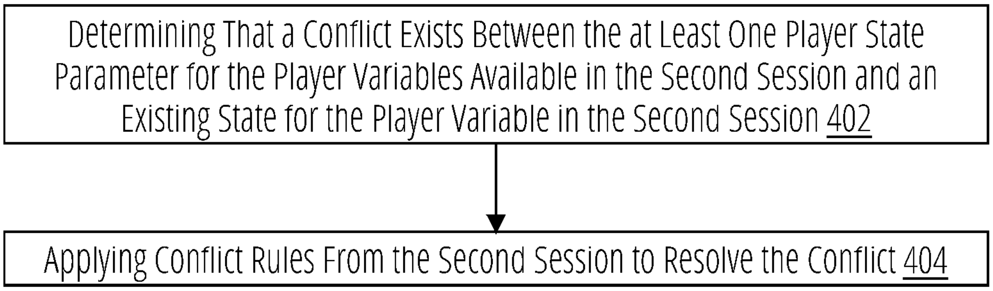
FIG. 4 illustrates an example routine for handling conflicts that can occur when loading player state parameters in accordance with some aspects of the present technology.

FIG. 4 illustrates an example routine for handling conflicts that can occur when loading player state parameters in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

One challenge of the present technology is that in a multiplayer or peer-to-peer environment, many different players have the potential to store their own state associated with the same player variable. This can create conflicts if the player attempts to enter a world in which a current state for that player variable already exists that might conflict with the state to be imported. The present technology provides for authors of worlds to create conflict resolution rules for such instances.

In some embodiments, the applying the at least one player state parameter at block 218 can be disrupted when the method includes determining that a conflict exists between the at least one player state parameter for a player variable available in the second session and an existing state for the player variable in the second session at block 402. For example, the client 104 illustrated in FIG. 1 may determine that a conflict exists between the at least one player state parameter for the player variables available in the second session and an existing state for the player variable in the second session.

Different types of player variables can be subject to different types of conflicts. In the case of an avatar variable or a user account variable, a conflict can occur when the virtual environment of the second session might not fully support the player variable, or might prohibit the player variable. In the case of a world variable, a conflict might occur when another player has a player state parameter already applied to the player variable such that the player state parameter cannot be applied without overriding the existing player state parameter of the other player.

According to some examples, the method includes applying conflict rules from the second session to resolve the conflict at block 404. For example, the client 104 illustrated in FIG. 1 may apply conflict rules from the second session to resolve the conflict. More specifically, the creators of the virtual environments can provide conflict resolution rules to handle these types of conflicts, and the coding of the virtual environment can resolve the conflict or provide sufficient communication to the players to provide a suitable user experience.

Figure 5:
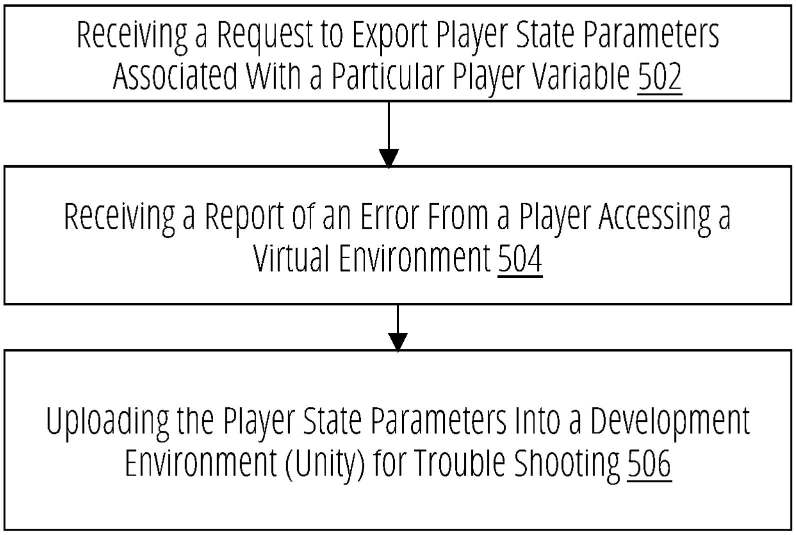
FIG. 5 illustrates an example routine for exporting player state parameters from a virtual environment into a development environment in accordance with some aspects of the present technology.

FIG. 5 illustrates an example routine for exporting player state parameters from a virtual environment into a development environment in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The present technology can also facilitate the troubleshooting of virtual environments. It can occur that a player can experience unexpected performance in a virtual environment that might be caused by the player's state. In such instances, it can be helpful for the player to export their player state parameters and provide them to a developer or author of the virtual environment.

According to some examples, the method includes receiving a request to export player state parameters associated with a particular player variable at block 502.

According to some examples, the method includes receiving a report of an error from a player accessing a virtual environment at block 504. The report of the error includes exported player state parameters for player variables defined in the virtual environment. The report can be sent to the developer of the virtual environment.

According to some examples, the method includes uploading the player state parameters into a development environment, such as UNITY EDITOR for troubleshooting at block 506. In this way, the developer can experience their virtual environment with the same player state parameters as the player which can facilitate the troubleshooting.

Figure 6:
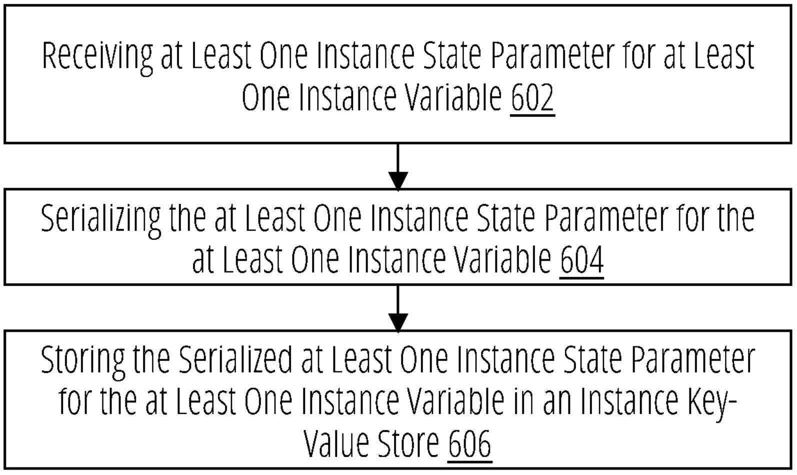
FIG. 6 illustrates an example routine for saving instance state parameters in accordance with some aspects of the present technology.

FIG. 6 illustrates an example routine for saving instance state parameters in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

While the present disclosure has predominantly addressed aspects of player persistence through the saving of player state parameters, the present technology also pertains to the saving of instance persistence through the saving of instance state parameters. While player persistence pertains to saying parameters that are specific to the player, instance persistence pertains to saving parameters that are tied to the instance rather than a specific player. In the present technology instances are usually multi-player instances, and a saved instance might be, for example, a private version of a world.

Accordingly, just as with the player state parameters, the method includes receiving at least one instance state parameter for at least one instance variable at block 602. For example, the client 104 illustrated in FIG. 1 may receive at least one instance state parameter for at least one instance variable.

According to some examples, the method includes serializing the at least one instance state parameter for the at least one instance variable at block 604. For example, the client 104 illustrated in FIG. 1 may serialize the at least one instance state parameter for the at least one instance variable.

According to some examples, the method includes storing the serialized at least one instance state parameter for the at least one instance variable in an instance key-value store at block 606. For example, the worlds API 128 illustrated in FIG. 1 may store the serialized at least one instance state parameter for the at least one instance variable in an instance key-value store.

Unlike with player persistence, instance persistence is not automatically applied. A player can access a persisted instance by explicitly choosing to load the instance. This in contrast to player persistence wherein any saved player state parameters that are applicable in a given virtual environment are automatically reinstated.

Figure 7:
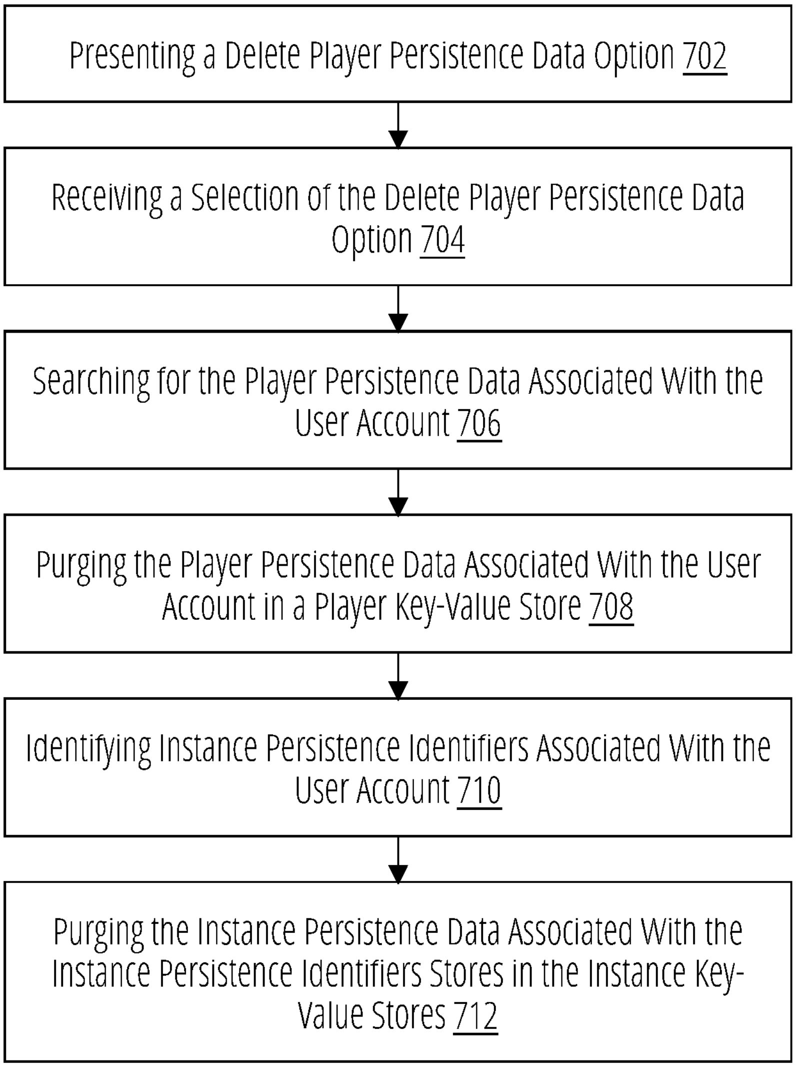
FIG. 7 illustrates an example routine for purging persistence data associated with a user account in accordance with some aspects of the present technology.

FIG. 7 illustrates an example routine for purging persistence data associated with a user account in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Player privacy is an important aspect of the present technology. Accordingly, several features of the present technology are aimed at respecting the data privacy of players. While the present technology involves automatically saving player state parameters to provide player persistence, the saving of this data is done in accordance with industry-accepted privacy policies.

Furthermore, several features of graphical user interfaces of client 104 can indicate when player state parameters are being saved and that player state parameters have been saved. Saving of instance state parameters is the result of specific user interactions that indicate an express desire for instance persistence.

Additionally, the present technology puts the player in control of their data. In some embodiments, a player can request that their player persistence data and any instance persistence data that is saved at the request of the player can be deleted.

According to some examples, the method includes presenting a delete player persistence data option at block 702. For example, the client 104 illustrated in FIG. 1 may present a delete player persistence data option. An example of this option is illustrated as delete player persistence button 802 in FIG. 8.

According to some examples, the method includes receiving a selection of the delete player persistence data option at block 704. For example, the client 104 illustrated in FIG. 1 may receive a selection of the delete player persistence data option.

According to some examples, the method includes searching for the player persistence data associated with the user account at block 706. For example, the player persistence API 148 illustrated in FIG. 1 may search for the player persistence data associated with the user account.

According to some examples, the method includes purging the player persistence data associated with the user account in a player key-value store at block 708. For example, the player persistence API 148 illustrated in FIG. 1 may purge the player persistence data associated with the user account in a player key-value store. In some embodiments, the player persistence data can be deleted on a per-virtual environment basis, or on a per-user account basis.

As noted above, in some examples, the player might also want to delete any instance state parameters they may have caused to be saved too. The method includes identifying instance persistence identifiers associated with the user account at block 710. For example, the player persistence API 148 illustrated in FIG. 1 may identify instance persistence identifiers associated with the user account.

According to some examples, the method includes purging the instance persistence data associated with the instance persistence identifiers stored in the instance key-value stores at block 712. For example, the player persistence API 148 illustrated in FIG. 1 may purge the instance persistence data associated with the instance persistence identifiers stored in the instance key-value stores.

Figure 8:
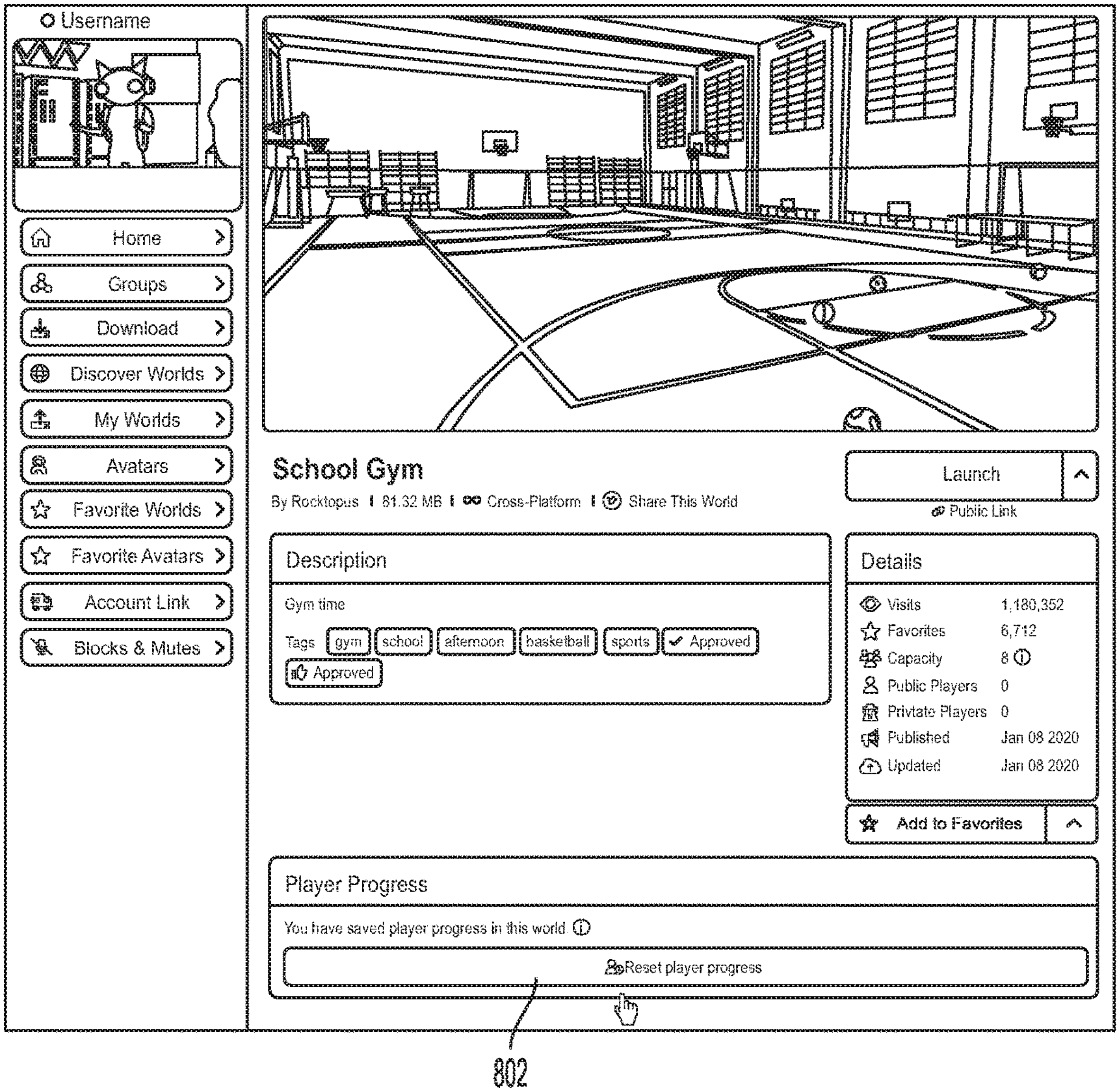
FIG. 8 illustrates an example user interface for a virtual environment called "School Gym" in accordance with some aspects of the present technology.

FIG. 8 illustrates an example user interface for a virtual environment called "School Gym" in accordance with some aspects of the present technology. The example user interface is presented for example purposes only and is not to be considered the only way to inform the user about the existence of player persistence or instance persistence data, or to delete such data.

The virtual environment of "School Gym" can be a world in which players can participate in various activities and the player can earn the right to wear a particular uniform, or the ability to access certain features through gameplay. Player persistence ensures that the privileges the player earned through previous gameplay remain available to the user in future visits to the virtual environment.

The user interface illustrating aspects of "School Gym" can also include a notification that player persistence data for the player has been saved for this virtual environment. In this example, player persistence is called player progress. The user interface also includes a delete player persistence button 802 which can be used to delete all player persistence data for the player associated with this virtual environment.

If the player was not associated with any player persistence for this virtual environment, the player progress section would not appear, or it would be blank.

This user interface demonstrates just one way in which a player can be informed that player persistence data exists and the player can control whether the data is maintained or deleted.

Figure 9:
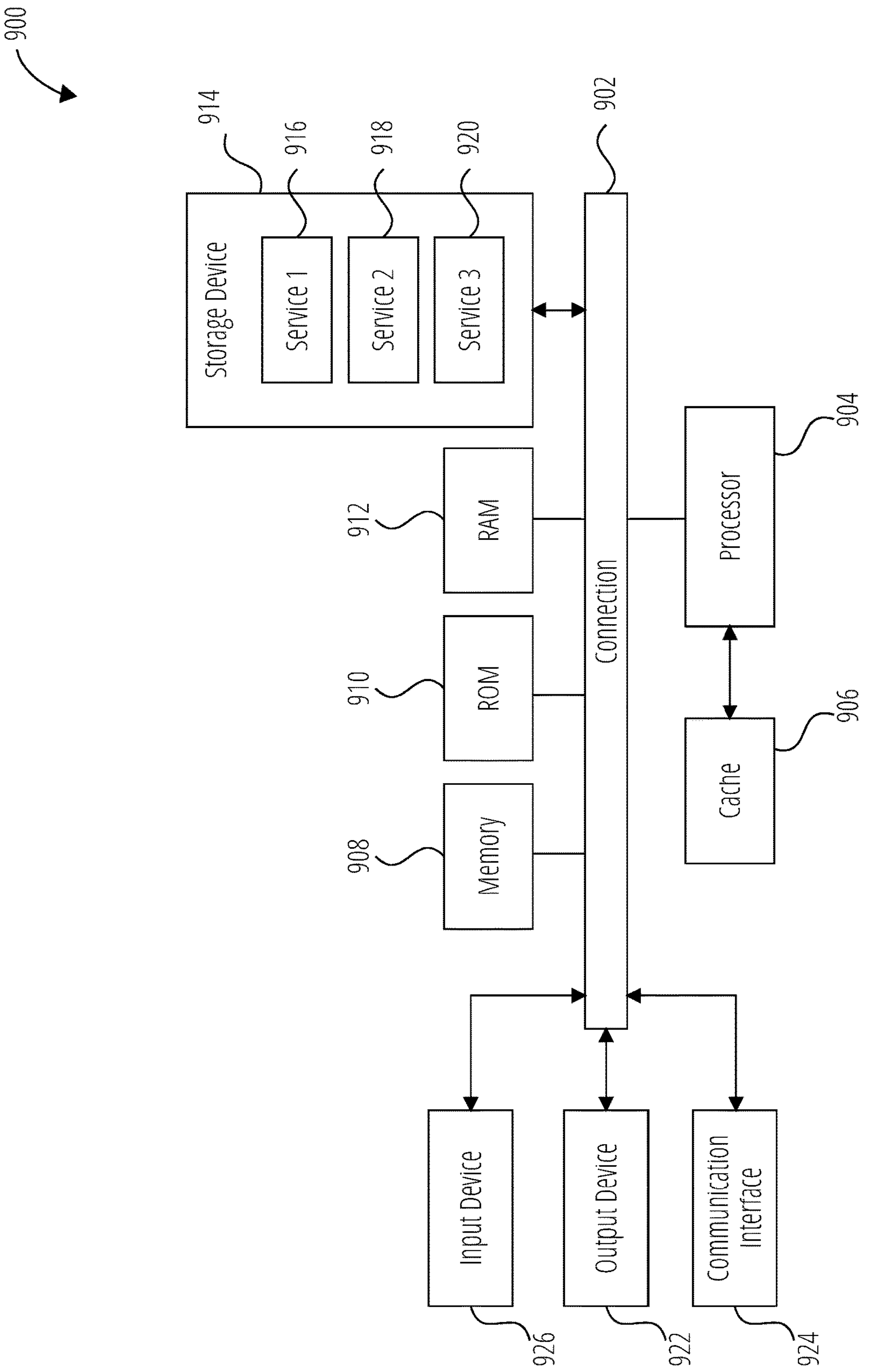
FIG. 9 shows an example of a system for implementing certain aspects of the present technology.

FIG. 9 shows an example of computing system 900, which can be for example any computing device making up client device 106, web services 110, or networking services 112, or any component thereof in which the components of the system are in communication with each other using connection 902. Connection 902 can be a physical connection via a bus, or a direct connection into processor 904, such as in a chipset architecture. Connection 902 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 904 and connection 902 that couples various system components including system memory 908, such as read-only memory (ROM) 910 and random access memory (RAM) 912 to processor 904. Computing system 900 can include a cache of high-speed memory 906 connected directly with, in close proximity to, or integrated as part of processor 904.

Processor 904 can include any general purpose processor and a hardware service or software service, such as services 916, 918, and 920 stored in storage device 914, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 914 can include software services, servers, services, etc., that when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Some aspects of the present technology include:

Aspect 1. A method for persisting player state across multiple sessions in a peer-to-peer application environment, the method comprising: receiving at least one player state parameter for at least one player variable, wherein the at least one player variable being identified by a unique identifier during a first session; serializing the at least one player state parameter for the at least one player variable; receiving the serialized at least one player state parameter for the at least one player variable, wherein the at least one player variable is identified by an unique identifier; storing the serialized at least one player state parameter for the at least one player variable in a key-value store, wherein the serialized at least one player state parameter is a value associated with the unique identifier as a key in the key-value store; receiving a request to initiate a second session for the user account; retrieving a list including of player variables available in the second session; retrieving the stored at least one player state parameter matching the player variables available in the second session from the key-value store; applying the at least one player state parameter for the player variables available in the second session.

Aspect 2. The method of Aspect 1, wherein the unique identifier is derived from a hash of a string that identifies the player variable and a container name, wherein the container name identifies the world in which the player variable exists, the avatar to which the player variable is associated, or the user account to which the player variable is associated.

Aspect 3. The method of any of Aspects 1 to 2, wherein the player variable is one or more of an avatar variable, a user account variable, or world variable, wherein the avatar variable is a variable that affects a state of an avatar, wherein the user account variable is a variable that affects a state of a user account, wherein the world variable is a variable that affects state of an object in a world occupied by the player.

Aspect 4. The method of any of Aspects 1 to 3, wherein the player variable is defined by the author of the avatar or world.

Aspect 5. The method of any of Aspects 1 to 4, further comprising: receiving at least one instance state parameter for at least one instance variable; serializing the at least one instance state parameter for the at least one instance variable; storing the serialized at least one instance state parameter for the at least one instance variable in an instance key-value store, wherein the player state parameters are stored in a player key-value store associated with a user account associated with the player, and the player key-value store and instance key-value stores are different.

Aspect 6. The method of any of Aspects 1 to 5, further comprising: presenting an indicator within a user interface indicating when the at least one player state parameter is stored.

Aspect 7. The method of any of Aspects 1 to 6, further comprising: presenting a delete player persistence data option; receiving a selection of the delete player persistence data option; searching for the player persistence data associated with the user account; purging the player persistence data associated with the user account in a player key value store; identifying instance persistence identifiers associated with the user account; and purging the instance persistence data associated with the instance persistence identifiers stored in the instance key value stores.

Aspect 8. The method of any of Aspects 1 to 7, wherein the key-value store persistently stores the instance state parameter for the at least one player variable, wherein newer versions of the instance state parameter are stored over time, wherein the retrieving the stored at least one player state parameter matching the player variables available in the second session from the key-value store includes identifying a most recent version of the instance state parameter.

Aspect 9. The method of any of Aspects 1 to 8, further comprising: determining that a conflict exists between the at least one player state parameter for the player variables available in the second session and an existing state for the player variable in the second session, wherein a conflict includes an unsupported player state parameter, or a second user has a second player state parameter applied to the player variable; applying conflict rules from the second session to resolve the conflict.

Aspect 10. The method of any of Aspects 1 to 9, further comprising: wherein a second session occurs when a player accesses a virtual environment at a second time, wherein a second session occurs when a player accesses a second virtual environment where the second virtual environment uses the same player variables as a first virtual environment, wherein the first virtual environment and the second virtual environment are part of a world group.

Aspect 11. The method of any of Aspects 1 to 10, the method comprising: receiving a report of an error from a player accessing a virtual environment, wherein the report of the error includes player state parameters for player variables defined in the virtual environment; and uploading the player state parameters into a development environment for trouble shooting.

Aspect 12. The method of any of Aspects 1 to 11, the method comprising: receiving a request to export player state parameters associated with a particular player variable.

Aspect 13. The method of any of Aspects 1 to 12, the method comprising: whereby the exported player state parameter are imported into the new virtual environment, for example, artwork created in a first virtual environment can be imported in a new virtual environment.

Aspect 14. The method of any of Aspects 1 to 13, wherein the receiving the at least one player state parameter periodically, wherein the receiving the at least one player state parameter after a significant game event, wherein the significant game event being specified by a virtual environment and being pushed to the web service, wherein the significant game event is a save operation initiated by the player, wherein the significant game event is the player exiting the virtual environment.

What is claimed is:

1. A method for persisting player state for a player across multiple sessions in a peer-to-peer application environment, the method comprising:

receiving, during a first session, at least one player state parameter for at least one player variable, the at least one player variable being identified by a unique identifier;

storing the at least one player state parameter for the at least one player variable in a key-value store, wherein the at least one player state parameter is a value associated with the unique identifier;

receiving a request for player state parameters in association with an initiation of a second session;

retrieving the stored at least one player state parameter matching the at least one player variable available in the second session;

determining whether applying the retrieved at least one player state parameter conflicts with an existing state for the at least one player variable in the second session; and applying, in the second session:

the at least one player state parameter upon determining that applying the retrieved at least one player state parameter does not conflict with the existing state, or a resolved state for the at least one player variable upon determining that applying the retrieved at least one player state parameter conflicts with the existing state, wherein the resolved state is determined by applying conflict rules from the second session to resolve a conflict.

2. The method of claim 1, wherein the unique identifier is derived from a hash of a string that identifies the at least one player variable and a container name, wherein the container name identifies a world in which the at least one player variable exists, an avatar to which the at least one player variable is associated, or a user account to which the at least one player variable is associated.

3. The method of claim 1, wherein:

the at least one player variable affects a state of an object in a world occupied by the player, and the existing state results from application, in the second session, of a second player state parameter of a second player to the at least one player variable, and wherein applying the retrieved at least one player state parameter conflicts with the existing state when the retrieved at least one player state parameter cannot be applied without overriding the second player state parameter.

4. The method of claim 1, wherein the key-value store persistently stores the player state parameter for the at least one player variable, wherein newer versions of the player state parameter are stored over time, wherein the retrieving the stored at least one player state parameter matching the at least one player variable available in the second session from the key-value store includes identifying a most recent version of the player state parameter.

5. The method of claim 1, further comprising:

determining that applying the retrieved at least one player state parameter conflicts with the existing state; and applying the resolved state.

6. The method of claim 1, wherein the second session occurs when a player accesses a virtual environment at a second time, wherein the second session occurs when the player accesses a second virtual environment where the second virtual environment uses the at least one player variable from a first virtual environment, wherein the first virtual environment and the second virtual environment are part of a world group.

7. The method of claim 1, the method comprising:

receiving a request to export the player state parameters associated with a particular player variable;

applying the player state parameters that were exported to a new player variable in a new virtual environment, whereby the player state parameters are imported into the new virtual environment.

8. The method of claim 1, further comprising:

receiving a request to export the player state parameters associated with a particular player variable;

creating a new player variable in the key-value store that is associated with a new virtual environment different from a virtual environment of the first session; and associating the exported player state parameters with the new player variable, whereby the player state parameters are imported into the new virtual environment.

9. A computing system comprising:

a processor; and a memory storing instructions that, when executed by the processor, configure the system to:

receive, during a first session, at least one player state parameter for at least one player variable, the at least one player variable being identified by a unique identifier;

store the at least one player state parameter for the at least one player variable in a key-value store, wherein the at least one player state parameter is a value associated with the unique identifier;

receive a request for player state parameters in association with an initiation of a second session;

retrieve the stored at least one player state parameter matching the at least one player variable available in the second session;

determine whether applying the retrieved at least one player state parameter conflicts with an existing state for the at least one player variable in the second session; and apply, in the second session:

the at least one player state parameter upon determining that applying the retrieved at least one player state parameter does not conflict with the existing state, or a resolved state for the at least one player variable upon determining that applying the retrieved at least one player state parameter conflicts with the existing state, wherein the resolved state is determined by applying conflict rules from the second session to resolve a conflict.

10. The computing system of claim 9, wherein the unique identifier is derived from a hash of a string that identifies the at least one player variable and a container name, wherein the container name identifies a world in which the at least one player variable exists, an avatar to which the at least one player variable is associated, or a user account to which the at least one player variable is associated.

11. The computing system of claim 9, wherein the at least one player variable that affects state of an object in a world occupied by a player associated with the at least one player variable.

12. The computing system of claim 9, wherein the key-value store persistently stores the player state parameter for the at least one player variable, wherein newer versions of the player state parameter are stored over time, wherein the retrieving the stored at least one player state parameter match the at least one player variable available in the second session from the key-value store includes identifying a most recent version of the player state parameter.

13. The computing system of claim 9, wherein the instructions further configure the system to:

determine that applying the retrieved at least one player state parameter conflicts with the existing state; and apply the resolved state.

14. The computing system of claim 9, wherein the second session occurs when a player accesses a virtual environment at a second time, wherein the second session occurs when the player accesses a second virtual environment where the second virtual environment uses the at least one player variable from a first virtual environment, wherein the first virtual environment and the second virtual environment are part of a world group.

15. The computing system of claim 9, wherein the instructions further configure the system to:

receive a request to export the player state parameters associated with a particular player variable;

apply the player state parameters that were exported to a new player variable in a new virtual environment, whereby the player state parameters are imported into the new virtual environment.

16. A non-transitory computer-readable storage medium, the computer-readable storage medium including instructions that when executed by a computer, cause the computer to:

receive, during a first session, at least one player state parameter for at least one player variable, the at least one player variable being identified by a unique identifier;

store the at least one player state parameter for the at least one player variable in a key-value store, wherein the at least one player state parameter is a value associated with the unique identifier;

receive a request for player state parameters in association with an initiation of a second session;

retrieve the stored at least one player state parameter matching the at least one player variable available in the second session;

determine whether applying the retrieved at least one player state parameter conflicts with an existing state for the at least one player variable in the second session; and apply, in the second session:

the at least one player state parameter upon determining that applying the retrieved at least one player state parameter does not conflict with the existing state, or a resolved state for the at least one player variable upon determining that applying the retrieved at least one player state parameter conflicts with the existing state, wherein the resolved state is determined by applying conflict rules from the second session to resolve a conflict.

17. The computer-readable storage medium of claim 16, wherein the unique identifier is derived from a hash of a string that identifies the at least one player variable and a container name, wherein the container name identifies a world in which the at least one player variable exists, an avatar to which the at least one player variable is associated, or a user account to which the at least one player variable is associated.

18. The computer-readable storage medium of claim 16, wherein the at least one player variable that affects state of an object in a world occupied by a player associated with the at least one player variable.

19. The computer-readable storage medium of claim 16, wherein the key-value store persistently stores the player state parameter for the at least one player variable, wherein newer versions of the player state parameter are stored over time, wherein the retrieving the stored at least one player state parameter match the at least one player variable available in the second session from the key-value store includes identifying a most recent version of the player state parameter.

20. The computer-readable storage medium of claim 16, wherein the second session occurs when a player accesses a virtual environment at a second time, wherein the second session occurs when the player accesses a second virtual environment where the second virtual environment uses the at least one player variable from a first virtual environment, wherein the first virtual environment and the second virtual environment are part of a world group.

* * * * *